United States Patent
Gross et al.

(10) Patent No.: US 10,446,814 B2
(45) Date of Patent: Oct. 15, 2019

(54) HIGH VOLTAGE TEST AND SERVICE MODULE WITH AN INTERLOCK

(71) Applicants: Oliver Gross, Oxford, MI (US); Raymond Price, Shelby Township, MI (US); Qian Turner, Clarkston, MI (US)

(72) Inventors: Oliver Gross, Oxford, MI (US); Raymond Price, Shelby Township, MI (US); Qian Turner, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 255 days.

(21) Appl. No.: 15/332,038

(22) Filed: Oct. 24, 2016

(65) Prior Publication Data

US 2018/0113157 A1 Apr. 26, 2018

(51) Int. Cl.
| | | |
|---|---|---|
| *G01R 19/145* | (2006.01) | |
| *B60L 11/18* | (2006.01) | |
| *H02J 7/00* | (2006.01) | |
| *B60L 3/04* | (2006.01) | |
| *H01M 2/10* | (2006.01) | |

(Continued)

(52) U.S. Cl.
CPC ............. *H01M 2/1083* (2013.01); *B60L 3/04* (2013.01); *B60L 3/12* (2013.01); *B60L 58/12* (2019.02); *B60L 58/16* (2019.02); *H02J 7/0021* (2013.01); *H02J 7/0045* (2013.01); *H01M 2220/20* (2013.01); *Y02T 10/705* (2013.01); *Y02T 10/7005* (2013.01); *Y02T 10/7044* (2013.01)

(58) Field of Classification Search
CPC ...... B60L 3/04; B60L 3/0069; B60L 11/1861; B60L 3/0092; H01R 13/14; H01R 13/703; H01R 13/7031; H01R 31/08; H01R 2201/26; H01R 13/684; H01R 13/707; H01R 13/447; H01R 13/53; H01R 13/62938; H01R 13/62944; H01R 13/62955; H01R 13/6335; H01R 13/6397; H01R 13/648; H01R 13/66; H01R 13/688; H01R 13/713; H01R 2103/00
See application file for complete search history.

(56) References Cited

U.S. PATENT DOCUMENTS

| | | | |
|---|---|---|---|
| 6,273,736 B1 * | 8/2001 | Taylor .................... | H01R 13/44 439/149 |
| 7,084,361 B1 | 8/2006 | Bowes et al. | |

(Continued)

FOREIGN PATENT DOCUMENTS

| | | | | |
|---|---|---|---|---|
| CN | 104793538 A | 7/2015 | | |
| WO | WO-2016045998 A1 * | 3/2016 | ............ | B60L 3/0023 |

*Primary Examiner* — Imran Akram
(74) *Attorney, Agent, or Firm* — Ralph E Smith

(57) ABSTRACT

A high voltage test and service module configured to electrically couple to a high voltage circuit of a vehicle is provided. The module includes a module housing, a fuse disposed in the module housing, a positive high voltage test point disposed in the module housing, and a negative high voltage test point disposed in the module housing. A first high voltage interlock (HVIL) connector is disposed in the module housing and configured to electrically couple to a high voltage interlock. A second HVIL connector is removably disconnected from the first HVIL connector to break the high voltage interlock. The positive and negative high voltage test points enable testing and monitoring of the high voltage circuit to determine if a voltage or current resides on the high voltage circuit before servicing thereof.

18 Claims, 4 Drawing Sheets

(51) Int. Cl.
  *B60L 3/12*   (2006.01)
  *B60L 58/16*  (2019.01)
  *B60L 58/12*  (2019.01)

(56) References Cited

U.S. PATENT DOCUMENTS

| | | | |
|---|---|---|---|
| 7,586,722 B2 | 9/2009 | Scholer et al. | |
| 7,789,690 B1 * | 9/2010 | Rhein | H01R 13/53 439/310 |
| 8,043,108 B2 | 10/2011 | Albert et al. | |
| 8,098,126 B2 | 1/2012 | Niedzwiecki et al. | |
| 8,199,449 B2 | 6/2012 | Kuschnarew et al. | |
| 8,734,191 B2 | 5/2014 | Zhao | |
| 2008/0258667 A1 * | 10/2008 | Morris | G01R 1/04 318/490 |
| 2009/0073624 A1 * | 3/2009 | Scholer | B60L 3/0069 361/88 |
| 2010/0084205 A1 | 4/2010 | Tarchinski et al. | |
| 2010/0255709 A1 | 10/2010 | Tyler | |
| 2012/0108106 A1 * | 5/2012 | de Chazal | H01R 13/684 439/620.26 |
| 2014/0035592 A1 * | 2/2014 | Wickert | H01M 2/344 324/426 |
| 2014/0038017 A1 * | 2/2014 | Wickert | H01M 2/1072 429/99 |
| 2014/0062180 A1 * | 3/2014 | Demmerle | H01H 51/28 307/9.1 |
| 2014/0062493 A1 * | 3/2014 | Farrell | B60L 50/50 324/426 |
| 2014/0193990 A1 | 7/2014 | Zhao et al. | |
| 2015/0061413 A1 * | 3/2015 | Janarthanam | H05K 5/0208 307/328 |
| 2015/0151740 A1 * | 6/2015 | Hynes | B60L 50/64 701/29.2 |
| 2015/0331041 A1 * | 11/2015 | Schaedlich | B60L 3/0069 324/750.3 |
| 2017/0292982 A1 * | 10/2017 | Acena | B60L 3/0069 |
| 2017/0307674 A1 * | 10/2017 | Fouedjio | B60L 3/0023 |

* cited by examiner

HIGH VOLTAGE TEST AND SERVICE MODULE WITH AN INTERLOCK

FIELD

The present application relates generally to high voltage battery systems and, more particularly, to a high voltage test and service module for high voltage battery systems.

BACKGROUND

Electric and hybrid electric vehicles typically include high voltage battery systems connected to components that operate at high voltages. A manual service disconnect (MSD) is often used to disconnect a high current power circuit and enable a technician to safely service such high voltage battery systems or associated components. The MSD is typically associated with a high voltage interlock system (HVIL) having an HVIL control circuit to monitor the mechanical continuity of the connector to a host device or battery. However, in order to verify that the voltage has been removed from the high current power circuit, the technician must access a separate location on the vehicle. Thus, while conventional MSD and HVIL systems work well for their intended purpose, there remains a desire for improvement in the relevant art.

SUMMARY

In one exemplary aspect of the invention, a high voltage test and service module configured to electrically couple to a high voltage circuit of a vehicle is provided. The module includes, in one exemplary implementation, a module housing, a fuse disposed in the module housing, a positive high voltage test point disposed in the module housing, and a negative high voltage test point disposed in the module housing. A first high voltage interlock (HVIL) connector is disposed in the module housing and configured to electrically couple to a high voltage interlock. A second HVIL connector is removably disconnected from the first HVIL connector to break the high voltage interlock. The positive and negative high voltage test points enable testing and monitoring of the high voltage circuit to determine if a voltage or current resides on the high voltage circuit before servicing thereof.

In another exemplary aspect of the invention, a high voltage battery system for a vehicle is provided. The system includes a battery pack and a high voltage test and service (HVTS) module. The battery pack includes a battery, a high voltage circuit coupled to the battery, and a high voltage interlock (HVIL) having an HVIL circuit. The (HVTS) module is electrically coupled to the high voltage circuit and includes a module housing, a fuse disposed in the module housing, a positive high voltage test point disposed in the module housing, and a negative high voltage test point disposed in the module housing. A first HVIL connector is disposed in the module housing and configured to electrically couple to the HVIL. A second HVIL connector is removably disconnected from the first HVIL connector to break the HVIL. The positive and negative high voltage test points enable testing and monitoring of the high voltage circuit to determine if a voltage or current resides on the high voltage circuit before servicing thereof.

Figure 1:
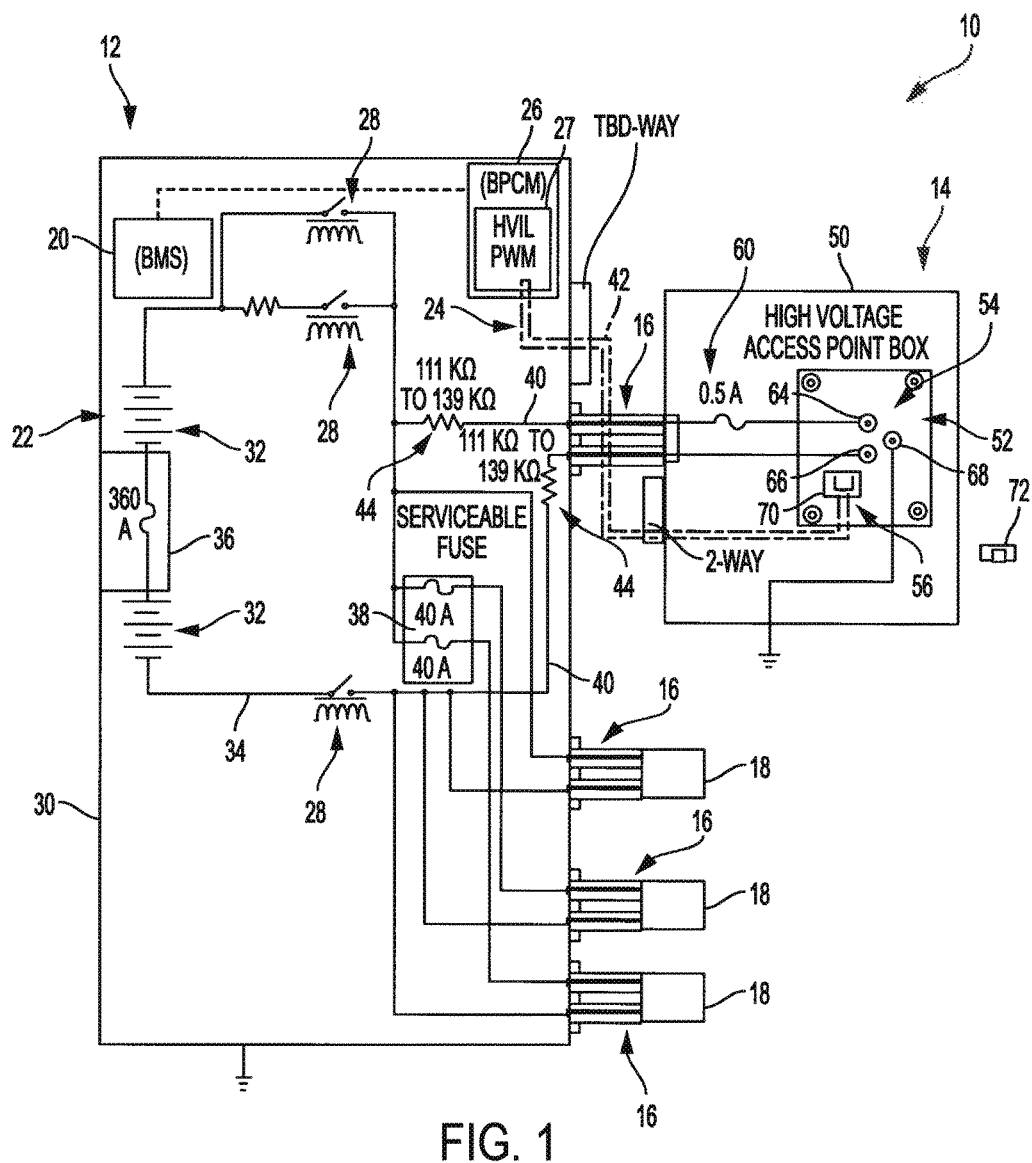
FIG. 1 is a schematic diagram of an example high voltage battery system in accordance with the principles of the present application.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed implementations and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

With initial reference to FIG. 1, an example high voltage battery system is illustrated and generally identified at reference numeral 10. High voltage battery system 10 generally includes a battery pack 12 and a high voltage test and service (HVTS) module 14. High voltage battery system 10 is associated with a vehicle such as an electric or hybrid electric vehicle. However, it will be appreciated that high voltage battery system 10 is configured for use in various other applications. Battery pack 12 includes a plurality of high voltage buses or connectors 16 configured to provide an electrical connection to power one or more components or accessories 18.

Figure 3:
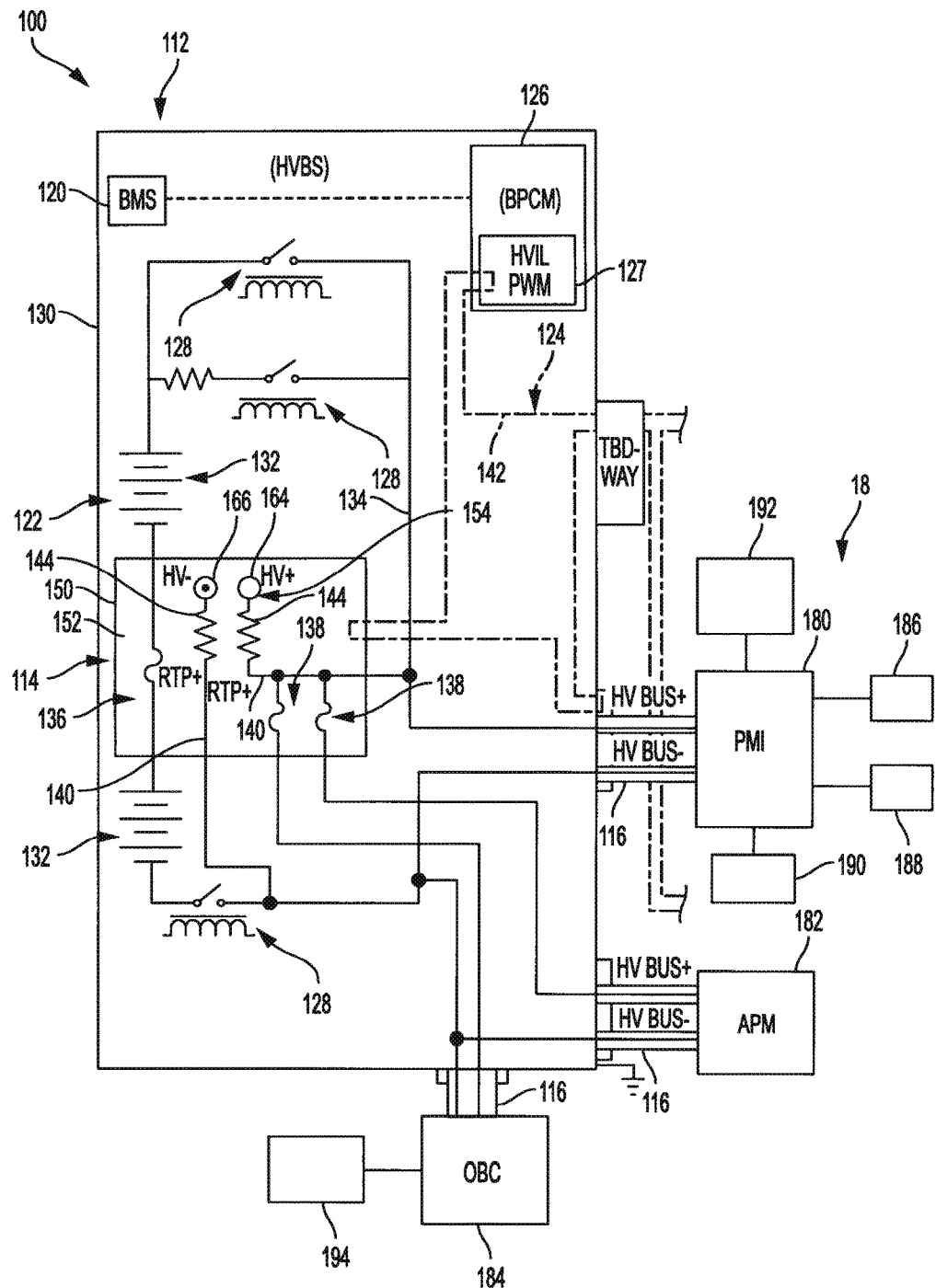
FIG. 3 is a schematic diagram of another example high voltage battery system in accordance with the principles of the present application.

HVTS module 14 is configured to provide both a manual service disconnect function and high voltage test points within a single, convenient package. As such, conventional manual service disconnects are replaced by a single unit to provide a technician with high voltage test points and fuse access in a single location. In one example implementation shown in FIG. 1, HVTS module 14 is separate from battery pack 12 and is located remote therefrom. For example, HVTS module 14 is located adjacent battery pack 12, within a vehicle interior, or in a vehicle trunk or underhood area. In other implementations, a HVTS module 114 is located on or in battery pack 12, for example as shown in FIG. 3.

With continued reference to FIG. 1, battery pack 12 generally includes a battery management system 20, one or more batteries 22 (only one shown), and a high voltage interlock (HVIL) 24. Battery management system 20, for example, is a control management system that manages battery state of function, provides control of high voltage contactors, and includes a battery pack control module (BPCM) 26. In the example implementation, BPCM 26 is a controller configured to monitor and control battery cells and modules for their state of function, state of charge, and state of health. In some examples, BPCM 26 is used to monitor current or voltage on the HVIL circuit 24, and is configured to selectively open one or more contactors 28 when HVIL circuit 24 is broken.

BPCM 26 includes an HVIL pulse width modulation (PWM) 27 connected to HVIL 24 and configured to detect an opening or significant degradation of the circuit's integrity that indicates that the integrity of the high voltage system is compromised. In an alternative configuration, HVIL PWM 27 is a constant current circuit (not shown).

In the example implementation, a battery housing 30 having a plurality of battery modules 32 each formed from a group of individual battery cells (not shown). The battery modules 32 are assembled and electrically connected to a high voltage circuit 34 associated with contactors 28, a main fuse 36, and one or more serviceable fuses 38. Contactors 28 are configured to manage connection of battery 22 to the various accessories or components 18 coupled to the high voltage system 10 by selectively closing contacts to establish an electrical path therebetween. In the example implementation, serviceable fuses 38 are configured to be accessible through battery housing 30 for service or replacement thereof.

In the example implementation illustrated in FIG. 1, battery 22 and high voltage circuit 34 are electrically coupled to HVTS module 14 via a pair of shielded high voltage cables or wires 40. Each high voltage wire 40 includes a resistor 44 configured to provide protection from direct high voltage access to the battery 22. Although shown as separately shielded, high voltage wires 40 may be in a single shielded cable.

HVIL 24 includes a low voltage, low current circuit 42 that provides a set of devices or locks (not shown) to open electrical circuit 42 and prevent current flow. Opening of HVIL circuit 42 subsequently causes contactors 28 to open and removes high voltage from the system. As such, HVIL 24 is configured to prevent access to the high voltage circuit 34 without first deenergizing the circuit. Once the high voltage is removed from circuit 34, the high voltage accessories 18 are accessible for testing or service.

As described herein in detail, HVTS module 14 is configured to combine high voltage testing and fuse access in a single location while eliminating a manual service disconnect. As illustrated in FIG. 1, HVTS module 14 generally includes a module housing 50, a removable environmental cover 52, high voltage test points 54, HVIL connectors 56, a fuse access panel 58, and a fuse 60.

Figure 2A:
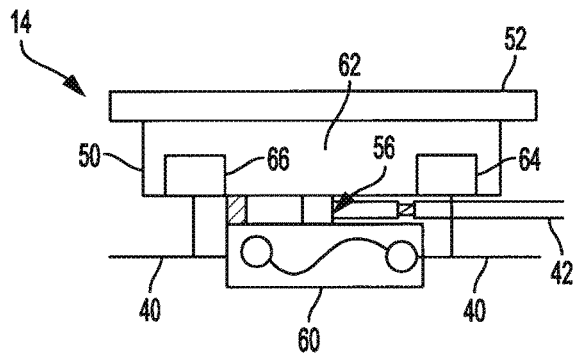
FIG. 2a is a schematic illustration of an example high voltage test and service (HVTS) module configured for use with the system shown in FIG. 1, in accordance with the principles of the present application.

With additional reference to FIG. 2a, module housing 50 defines a cavity 62 configured to receive high voltage test points 54, HVIL connectors 56, fuse access panel 58, and fuse 60. In particular, fuse 60 is disposed at a bottom of cavity 62 and is covered by fuse access panel 58, which is removably coupled to module housing 50, for example, by a plurality of fasteners (not shown). In one implementation, fuse 60 is coupled to module housing 50. Alternatively, fuse 60 is coupled to fuse access panel 58 and is removed from module housing 50 when fuse access panel 58 is removed.

High voltage test points 54 are disposed proximate or integral with fuse access panel 58 and are accessible when environmental cover 52 is removed from module housing 50. High voltage test points 54 include a positive first high voltage test point 64, a negative second high voltage test point 66, and a grounding third high voltage test point 68.

Positive and negative high voltage test points 64, 66 are each coupled to high voltage circuit 34 via high voltage wires 40. High voltage test points 64, 66 are finger-proof test points configured to receive a probe of a voltmeter, multi-meter or similar device configured to measure voltage or current on high voltage circuit 34.

Grounding high voltage test point 68 is electrically coupled to the vehicle chassis (not shown) or other ground or structure and enables an isolation measurement to determine if high voltage can be passed to the vehicle chassis. Grounding test point 68 is similarly a finger-proof test point and configured to receive a probe of voltmeter, multi-meter, or similar measurement device. This provides an alternate method to determine if high voltage resides on high voltage circuit 34. While such measurements are typically be taken by onboard diagnostics such as with battery management system 20, grounding high voltage test point 68 enables a technician to perform the measurements at HVTS module 14, which hastens and simplifies troubleshooting of the high voltage circuit 34.

As such, HVTS module 14 is configured to operate in either a meter voltage measurement mode or a resistance mode. In the meter voltage measurement mode, positive/negative high voltage test points 64, 66 are utilized to determine whether there is high voltage on high voltage circuit 34. In resistance mode, grounding test point 68 and one of positive/negative high voltage test points 64, 66 are utilized to measure the isolation resistance between test point 64, 66 and the vehicle chassis, to determine if there is a short circuit between the high voltage circuit 34 and the vehicle chassis.

In the example implementation, HVIL connectors 56 include a male side or first connector 70 and a female side or second connector 72. First connector 70 is electrically coupled to HVIL circuit 42 and is disposed proximate or integral with fuse access panel 58. First connector 70 is exposed when environmental cover 52 is removed from module housing 50 and fuse access panel 58 is secured to module housing 50 and prevents access to fuse 60. Second connector 72 is coupled to an inside of environmental cover 52 and is configured to mate with first connector 70, which closes HVIL circuit 42 In the illustrated implementation, connectors 70, 72 are mated when environmental cover 52 is coupled to module housing 50 by one or more fasteners (not shown).

As such, the connection between first and second connectors 70, 72 is automatically broken when environmental cover 52 is removed to gain access to high voltage test points 54 and fuse 60. This disconnection breaks HVIL circuit 42 and causes BPCM 26 to command contactors 28 to open and dissipates any high voltage on high voltage circuit 34. A technician then utilizes high voltage test points 54 to verify that there is no voltage on circuit 34.

However, if desired, a technician utilizes a tool (not shown) or the second connector 72 (which may be selectively removable from cover 52) to re-establish a connection with first connector 70. This opens HVIL circuit 42 and enables the voltage on high voltage circuit 34 to be measured and monitored via high voltage test points 64, 66. Further, during complex diagnostic high voltage work, for example, a technician may subsequently remove the tool or trip another location on HVIL circuit 42 to monitor voltage decay on high voltage circuit 34 via test points 64, 66.

Figure 2B:
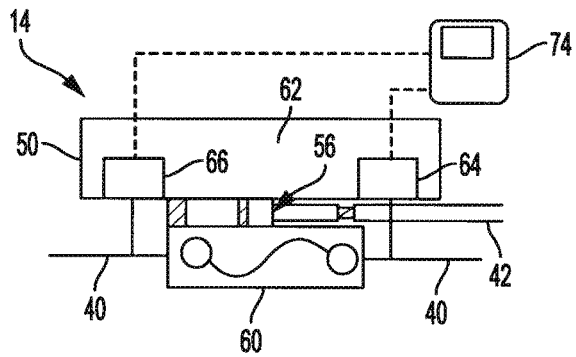
FIG. 2b is a schematic illustration of the HVTS module shown in FIG. 2a in a second operational condition in accordance with the principles of the present application.
Figure 2C:
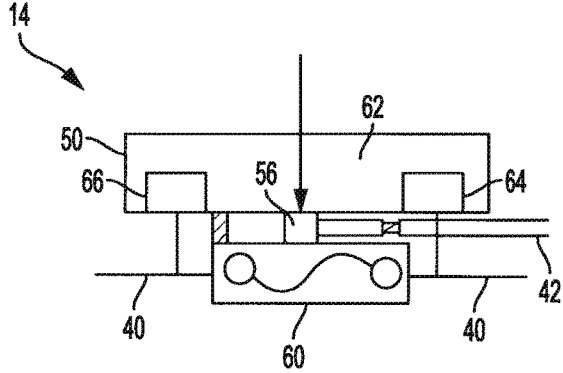
FIG. 2c is a schematic illustration of the HVTS module shown in FIG. 2a in a third operational condition in accordance with the principles of the present application.

With further reference to FIGS. 2a-2d, an example operation of HVTS module 14 will be described. FIGS. 1 and 2a illustrate HVTS module 14 in an assembled position. When service or testing is required of the high voltage circuit 34, a technician removes the environmental cover 52 from module housing 50 to expose high voltage test points 54, as shown in FIG. 2b. By removing cover 52, first and second connectors 70, 72 are disengaged, thereby breaking HVIL circuit 42 and opening contactors 28 to remove voltage from the high voltage circuit 34.

Probes of a voltmeter 74 are then be inserted into positive and negative high voltage test points 64, 66 to confirm there is no voltage on circuit 34 and it is safe to work on. Additionally, grounding test point 68 (not shown in FIG. 2b) and one of positive/negative high voltage test points 64, 66 are then utilized to measure the isolation resistance between test point 64, 66 and the vehicle chassis. In an alternative arrangement shown in FIG. 2c, HVIL connector 56 remains connected after removal of cover 52, and is subsequently manually broken after voltmeter 74 is connected to high voltage test points 54. This enables the technician to monitor high voltage decay on circuit 34.

Figure 2D:
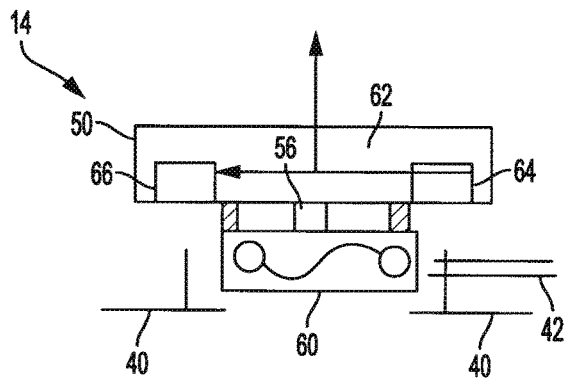
FIG. 2d is a schematic illustration of the HVTS module shown in FIG. 2a in a fourth operational condition in accordance with the principles of the present application.

As shown in FIG. 2d, at least a portion of module housing 50 (e.g., fuse access panel 58) is then removed from battery system 10 to provide access to service or replace fuse 60. In one example implementation, fuse 60 remains in the system when the portion of module housing 50 is removed. In another example implementation (shown in FIG. 2d), fuse 60 is coupled to the portion of module housing 50 that is removed.

Now with reference to FIG. 3, an example high voltage battery system 100 is illustrated that is similar to high voltage battery system 10 except a high voltage test and service (HVTS) module 114 is integrated into a battery pack 112, unlike FIG. 1 which illustrates a separate HVTS module 14 and battery pack 12.

High voltage battery system 100 is, in one exemplary implementation, similarly be associated with a vehicle such as an electric or hybrid electric vehicle. However, it will be appreciated that high voltage battery system 100 is configured for use in various other applications. Battery pack 112 is generally similar to battery pack 12 and includes a battery management system 120, one or more batteries 122 (only one shown), and a high voltage interlock (HVIL) 124.

Battery pack 112 further includes a plurality of high voltage buses or connectors 116 configured to provide an electrical connection to power one or more components or accessories 118 of the vehicle. For example, in the illustrated example, battery pack 112 is electrically connected to a power inverter module (PIM) 180, an auxiliary power module (APM) 182, and an on-board charger (OBC) 184. PIM 180 is electrically coupled a first motor 186, a second motor 188, an electric coolant heater (ECH) 190, and an electric air compressor (EAC) 192. OBC 184 is electrically coupled to a second electric coolant heater (ECH) 194.

As illustrated in FIG. 3, battery pack 112 generally includes a battery management system 120, one or more batteries 122 (only one shown), and a high voltage interlock (HVIL) 124. Battery management system 120 includes a battery pack control module (BPCM) 126 configured to monitor current or voltage on the HVIL circuit 124, and to selectively open one or more contactors 128 when HVIL circuit 124 is broken. BPCM 126 includes an HVIL pulse width modulation (PWM) 127.

In the example implementation, battery 122 comprises a battery housing 130 having a plurality of battery modules 132 each formed from a group of individual battery cells (not shown). The battery modules 132 are assembled and electrically connected to a high voltage circuit 134 associated with contactors 128, a main fuse 136, and one or more serviceable fuses 138. Contactors 128 are configured to manage the electrical connection of battery 122 to the various accessories or components 118 coupled to the high voltage system 10 by selectively closing contacts 128 to establish an electrical path therebetween. In the example implementation, main fuse 136 and serviceable fuses 138 are disposed within HVTS module 114, as described herein in more detail.

In the example implementation illustrated in FIG. 3, HVTS module 114 is integrated within battery pack 112 and is electrically coupled to battery 122 and high voltage circuit 134.

HVIL 124 includes a low voltage, low current circuit 142 that provides a set of devices or locks (not shown) to open electrical circuit 142 and prevent current flow. Opening of HVIL circuit 142 subsequently causes contactors 128 to open and removes high voltage from the system. As such, HVIL 124 is configured to prevent access to the high voltage circuit 134 without first deenergizing the circuit. Once the high voltage is removed from circuit 134, the high voltage accessories 118 is accessible for testing or service.

Figure 5:
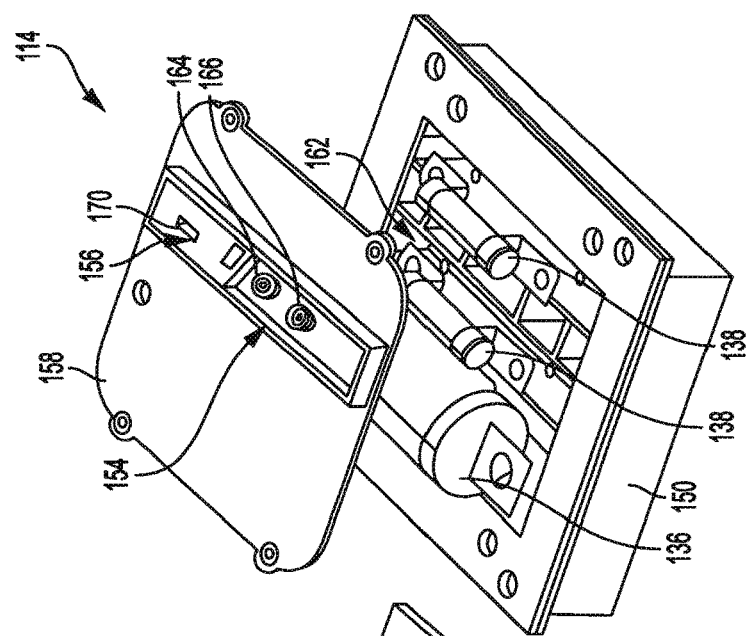
FIG. 5 is an exploded view of the HVTS module shown in FIG. 4 in accordance with the principles of the present application.
Figure 4:
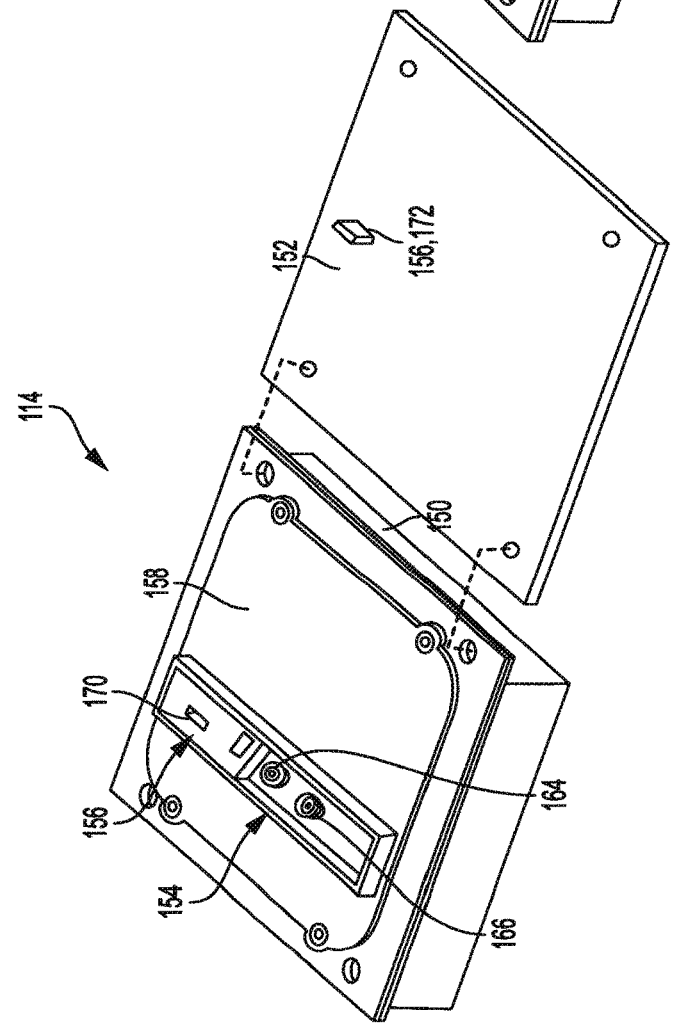
FIG. 4 is a perspective view of an example HVTS module configured for use with the system shown in FIG. 3 in accordance with the principles of the present application.

As described herein, HVTS module 114 is configured to combine high voltage testing and fuse access in a single location while eliminating a manual service disconnect. With further reference to FIGS. 4 and 5, HVTS module 114 generally includes a module housing 150, a removable environmental cover 152, high voltage test points 154, HVIL connectors 156, a fuse access panel 158, main fuse 136, and serviceable fuses 138.

Module housing 150 defines a cavity 162 configured to receive high voltage test points 154, HVIL connectors 156, fuse access panel 158, and fuses 136, 138. In particular, fuses 136, 138 are disposed at a bottom of cavity 162 and are covered by fuse access panel 158, which is removably coupled to module housing 150, for example, by a plurality of fasteners (not shown). In one implementation, fuses 136, 138 are coupled to module housing 150. Alternatively, fuses 136, 138 are coupled to fuse access panel 158 and are removed from module housing 150 when fuse access panel 158 is removed.

High voltage test points 154 are disposed proximate or are accessed through fuse access panel 158 and are accessible when environmental cover 152 is removed from module housing 150. High voltage test points 154 include a positive first high voltage test point 164 and a negative second high voltage test point 166. Although not shown, high voltage test points 154 may include a grounding third high voltage test point similar to 68.

Positive and negative high voltage test points 164, 166 are each coupled to high voltage circuit 134 via high voltage wires 140. Each high voltage wire 140 includes a resistor 144 configured to provide protection from direct high voltage access to the battery 122. High voltage test points 164, 166 are finger-proof test points configured to receive a probe of a voltmeter, multi-meter or similar device configured to measure voltage or current on high voltage circuit 134.

HVTS module 114 is configured to operate in either the meter voltage measurement mode or the resistance mode. In the meter voltage measurement mode, positive/negative high voltage test points 164, 166 are utilized to determine whether there is high voltage on high voltage circuit 134. In resistance mode, the grounding test point and one of positive/negative high voltage test points 164, 166 are utilized to measure the isolation resistance between test point 164, 166 and the vehicle chassis, to determine if there is a short circuit between the high voltage circuit 134 and the vehicle chassis.

In the example implementation, HVIL connectors 156 include a male side or first connector 170 and a female side or second connector 172. First connector 170 is electrically coupled to HVIL circuit 142 and is disposed proximate or integral with fuse access panel 158. First connector 170 is exposed when environmental cover 152 is removed from module housing 150 and fuse access panel 158 is secured to module housing 150 to prevent access to fuses 136, 138. Second connector 172 is coupled to an inside of environmental cover 152 and is configured to mate with first connector 170, which closes HVIL circuit 142. In the illustrated implementation, connectors 170, 172 are mated when environmental cover 152 is coupled to module housing 150, for example by one or more fasteners (not shown).

As such, the connection between first and second connectors 170, 172 is automatically broken when environmental cover 152 is removed to gain access to high voltage test points 154 and fuses 136, 138. This disconnection breaks HVIL circuit 142 and causes BPCM 126 to command contactors 128 to open and dissipate high voltage on high voltage circuit 134. A technician then utilizes high voltage test points 154 to verify that there is no voltage on circuit 134.

However, if desired, a technician utilizes a tool (not shown) or the second connector 172 (which may be selectively removable from cover 152) to re-establish a connection with first connector 170. This opens HVIL circuit 142 and enables the voltage on high voltage circuit 134 to be measured and monitored via high voltage test points 164, 166. Further, during complex diagnostic high voltage work, for example, a technician may subsequently remove the tool or trip another location on HVIL circuit 142 to monitor voltage decay on high voltage circuit 134 via test points 164, 166.

With further reference to FIGS. 4 and 5, an example operation of HVTS module 114 will be described. When service or testing is required of the high voltage circuit 134, a technician removes the environmental cover 152 from module housing 150 to expose high voltage test points 154, as shown in FIG. 4. By removing cover 152, first and second connectors 170, 172 are disengaged, thereby breaking HVIL circuit 142 and opening contactors 128 to remove voltage from the high voltage circuit 134.

Probes of a voltmeter (not shown) are then be inserted into positive and negative high voltage test points 164, 166 to confirm there is no current on circuit 134 and it is safe to work on. Additionally, the grounding test point (not shown) and one of positive/negative high voltage test points 164, 166 are utilized to measure the isolation resistance between test point 164, 166 and the vehicle chassis. In an alternative arrangement, HVIL connector 156 remains connected after removal of cover 152, and is subsequently manually broken after the voltmeter is connected to high voltage test points 154. This enables the technician to monitor high voltage decay on circuit 134.

As shown in FIG. 5, at least a portion of module housing 150 (e.g., fuse access panel 158) is then removed from battery system 100 to provide access to service or replace fuses 136, 138. In one example implementation (shown in FIG. 5), fuses 136, 138 remain in the system when the portion of module housing 150 is removed. In another example implementation (not shown), fuses 136, 138 are coupled to the portion of module housing 150 that is removed.

Described herein are systems and methods for safely testing and servicing a high voltage battery system. A high voltage test and service (HVTS) module combines a high voltage field test and fuse access into a single package, while eliminating a manual service disconnect (MSD). The HVTS module includes a two-stage actuation that first opens a high voltage interlock (HVIL), and subsequently enables fuse extraction. Integrated test points enable direct high voltage monitoring at the HVTS module to allow for safe service and diagnosis of the high voltage system without breaking the high voltage circuit. As such, fuse removal during service is not required and the high voltage can be safely monitored during all diagnostic and trouble-shooting work.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A high voltage test and service module configured to electrically couple to a high voltage circuit of a vehicle, the module comprising:
   a module housing;
   finger-proof positive and negative high voltage test points disposed on the module housing and configured to receive a probe of a testing device to test voltage on the high voltage circuit;
   a first high voltage interlock (HVIL) connector disposed in the module housing and configured to electrically couple to a high voltage interlock having a low voltage circuit; and
   a second HVIL connector removably disconnected from the first HVIL connector to break the high voltage interlock,
   wherein the positive and negative high voltage test points enable testing and monitoring of the high voltage circuit to determine if a voltage or current resides on the high voltage circuit before servicing thereof.

2. The module of claim 1, further comprising an environmental cover removably coupled to the module housing to prevent access to the positive and negative high voltage test points.

3. The module of claim 2, wherein the second HVIL connector is coupled to the environmental cover such that the second HVIL connector is connected to the first HVIL connector when the environmental cover is coupled to the module housing, and is disconnected from the first HVIL connector when the environmental cover is removed from the module housing.

4. The module of claim 1, further comprising a fuse access panel removably coupled to the module housing to prevent access to a fuse disposed in the module housing and configured to electrically couple to the high voltage circuit.

5. The module of claim 4, wherein the fuse is coupled to the module housing.

6. The module of claim 4, wherein the fuse is coupled to the fuse access panel.

7. The module of claim 1 further comprising a pair of high voltage wires configured to couple to the high voltage circuit, the pair of high voltage wires coupled to the positive and negative test points.

8. The module of claim 1, further comprising a grounding high voltage test point electrically coupled to a structural component of the vehicle, wherein the grounding high voltage test point is utilized with one of the positive and negative high voltage test points to measure isolation resistance.

9. A high voltage battery system for a vehicle, the system comprising:
a battery pack comprising:
a battery;
a high voltage circuit coupled to the battery; and
a high voltage interlock (HVIL) having a low voltage HVIL circuit; and
a high voltage test and service (HVTS) module electrically coupled to the high voltage circuit and comprising:
a module housing;
finger-proof positive and negative high voltage test points disposed on the module housing and electrically coupled to the high voltage circuit, and configured to receive a probe of a testing device to test voltage on the high voltage circuit;
a first HVIL connector disposed in the module housing and configured to electrically couple to the HVIL; and
a second HVIL connector removably disconnected from the first HVIL connector to break the HVIL,
wherein the positive and negative high voltage test points enable testing and monitoring of the high voltage circuit to determine if a voltage or current resides on the high voltage circuit before servicing thereof.

10. The system of claim 9, wherein the HVTS module is coupled to the vehicle in a location remote from the battery pack.

11. The system of claim 9, wherein the HUTS module is integrated into the battery pack.

12. The system of claim 9, wherein the HVTS module further comprises an environmental cover removably coupled to the module housing to prevent access to the positive and negative high voltage test points.

13. The system of claim 12, wherein the second HVIL connector is coupled to the environmental cover such that the second HVIL connector is connected to the first HVIL connector when the environmental cover is coupled to the module housing, and is disconnected from the first HVIL connector when the environmental cover is removed from the module housing.

14. The system of claim 13, wherein the HVTS module further comprises a fuse access panel removably coupled to the module housing to prevent access to a fuse disposed in the module housing and configured to electrically couple to the high voltage circuit.

15. The system of claim 13, wherein the HVTS module further comprises a pair of high voltage wires electrically coupled to the high voltage circuit, the pair of high voltage wires coupled to the positive and negative test points.

16. The system of claim 15, wherein the HVTS module further comprises a grounding high voltage test point electrically coupled to a structural component of the vehicle, wherein the grounding high voltage test point is utilized with one of the positive and negative high voltage test points to measure isolation resistance.

17. The system of claim 9, wherein the battery pack comprises a plurality of high voltage connectors coupled to high voltage components.

18. The system of claim 17, wherein the high voltage components include a power inverter module, an auxiliary power module, an electric coolant heater, and an electric air compressor.

* * * * *